United States Patent [19]

Nitta et al.

[11] Patent Number: 5,416,832
[45] Date of Patent: May 16, 1995

[54] CALL DETECTION CONTROL APPARATUS

[75] Inventors: Toshio Nitta; Toshikatsu Kobayashi, both of Tokyo; Takeshi Sasaki, Iwate; Tooru Ikeda, Tokyo, all of Japan

[73] Assignee: NEC Corporation, Tokyo, Japan

[21] Appl. No.: 71,777

[22] Filed: Jun. 4, 1993

[30] Foreign Application Priority Data

Jun. 5, 1992 [JP] Japan ................................ 4-145105
Aug. 24, 1992 [JP] Japan ................................ 4-223705

[51] Int. Cl.⁶ ......................................... H04M 3/22
[52] U.S. Cl. ................................ 379/190; 379/164; 379/165; 379/156; 379/162; 379/323; 379/324
[58] Field of Search ............. 379/377, 378, 383, 384, 379/279, 273, 274, 190, 164, 165, 156, 413, 379, 270, 16, 15, 323, 324, 162; 358/86

[56] References Cited

U.S. PATENT DOCUMENTS

| | | | |
|---|---|---|---|
| 3,968,327 | 7/1976 | Gregg, III | 358/86 |
| 4,809,318 | 2/1989 | Schoute | 379/279 |
| 4,908,856 | 3/1990 | Poletto | 379/413 |
| 5,283,825 | 2/1994 | Conforti et al. | 379/377 |

FOREIGN PATENT DOCUMENTS 2624132 5/1976 Germany.
2641913 9/1976 Germany.
2834995 8/1978 Germany.

*Primary Examiner*—James L. Dwyer
*Assistant Examiner*—Scott Wolinsky
*Attorney, Agent, or Firm*—Ostrolenk, Faber, Gerb & Soffen

[57] ABSTRACT

A call detection control apparatus includes individual call detecting circuits, a common call detecting circuit, switching circuits, and a power supply circuit. The individual call detecting circuits individually detect call signals, which originate from telephone subscriber lines. The common call detecting circuit commonly detects call signals, which originate from the respective telephone subscriber lines. The switching circuits switch the respective telephone subscriber lines from the common call detecting circuit to the respective individual call detecting circuit when the common call detecting circuit detects an call signal from one of the respective telephone subscriber lines. The power supply circuit supplies operating power to each of the individual call detecting circuits upon interlocking with an operation of a corresponding one of the switching circuits.

11 Claims, 7 Drawing Sheets

CALL DETECTION CONTROL APPARATUS

BACKGROUND OF THE INVENTION

The present invention relates to a call detection control apparatus for a subscriber circuit of a telephone switching system.

In a subscriber circuit of a conventional telephone switching system, as shown in FIG. 7, power is supplied from a power supply circuit 3 to all individual call detecting circuits 10 to 12 respectively prepared for telephone subscriber lines 30 to 32 regardless of whether each subscriber is engaged in speech communication, thereby always monitoring for a call signal that originates from each of the telephone subscriber lines.

Recently, such a call detecting circuit has been realized by an electronic circuit constituted by a semiconductor element and the like in consideration of size, weight, economy, durability, operating speed, and the like. Owing to the nature of this circuit, bias power is constantly supplied to the circuit, and hence the circuit operates while always consuming a bias current.

Since power is constantly supplied to this conventional call detection control apparatus, power is wasted in the individual call detecting circuits 10 to 12 even in an on-hook state. Therefore, with an increase in the number of telephone subscriber lines, the power consumption is increased.

SUMMARY OF THE INVENTION

It is an object of the present invention to provide a call detection control apparatus which can prevent wasteful consumption of power.

It is another object of the present invention to provide a call detection control apparatus in which the power consumption is not increased even if the number of telephone subscriber lines connected is increased.

It is still another object of the present invention to provide a call detection control apparatus which requires no special switching circuits and can improve economy, durability, and reliability and achieve a reduction in size and weight.

In order to achieve the above objects, according to the present invention, there is provided a call detection control apparatus comprising a plurality of individual call detecting means for individually detecting call signals that originate from telephone subscriber lines, common call detecting means for commonly detecting call signals originating from the respective telephone subscriber lines, a plurality of first switching means for switching the respective telephone subscriber lines from the common call detecting means to the individual call detecting means when the common call detecting means detects a call signal originating from one of the respective telephone subscriber lines; and power supply means for supplying operating power to each of the individual call detecting means upon interlocking with an operation of a corresponding one of the first switching means.

DESCRIPTION OF THE PREFERRED EMBODIMENTS

Figure 1:
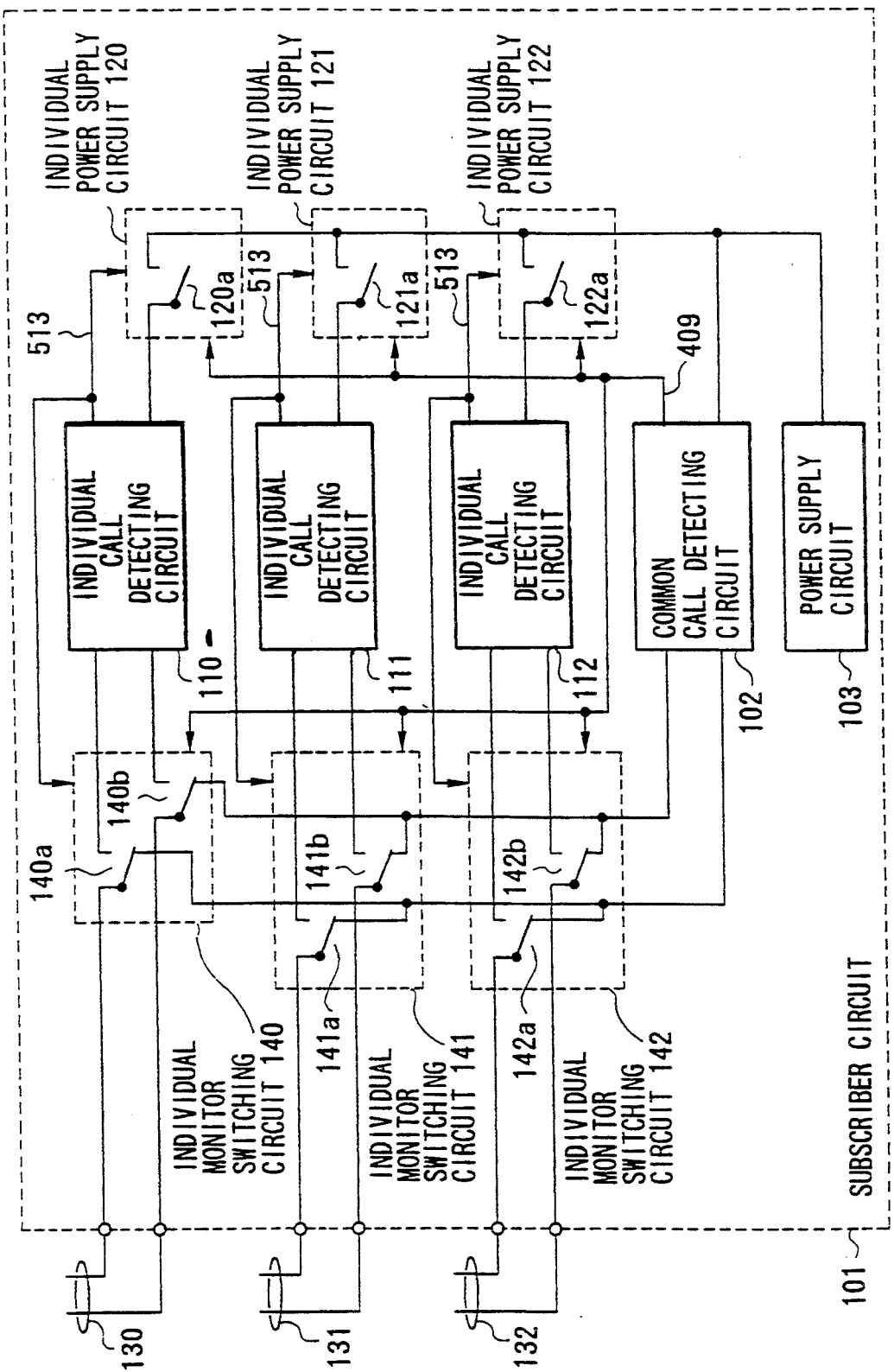
FIG. 1 is a block diagram showing a call detection control apparatus according to an embodiment of the present invention.

The present invention will be described below with reference to the accompanying drawings. FIG. 1 shows a call detection control apparatus according to an embodiment of the present invention.

As shown in FIG. 1, a subscriber circuit 101 of a telephone switching system is connected to individual telephone subscriber terminals (not shown) through telephone subscriber lines 130 to 132. The subscriber circuit 101 comprises a common call detecting circuit 102 for commonly monitoring a call that originates from each of the telephone subscriber lines 130 to 132, individual call detecting circuits 110 to 112 for individually monitoring calls originating from the telephone subscriber lines 130 to 132, individual monitor switching circuits 140 to 142 for switching the telephone subscriber lines 130 to 132 to the common call detecting circuit 102 and the individual call detecting circuits 110 to 112, individual power supply circuits 120 to 122 for individually performing power supply control of the individual call detecting circuits 110 to 112, and a power supply circuit 103 for directly supplying required operating power to the common call detecting circuit 102 and also supplying required operating power to the individual call detecting circuits 110 to 112 through the individual power supply circuits 120 to 122.

An operation of this embodiment will be described next. FIG. 1 shows a state of connection of all the telephone subscriber lines 130 to 132 in an on-hook state. More specifically, the break contact of each of pairs of transfer contacts 140a and 140b, 141a and 141b, and 142a and 142b of the relays of the individual monitor switching circuits 140 to 142 is connected to the common call detecting circuit 102 for commonly monitoring a call originating from each of the telephone subscriber lines 130 to 132. The supply of power from the power supply circuit 103 to the individual call detecting circuits 110 to 112 is stopped by make contacts 120a, 121a, and 122a of the individual power supply circuits 120 to 122. Meanwhile, power is being directly supplied from the power supply circuit 103 to the common call detecting circuit 102.

Figure 2:
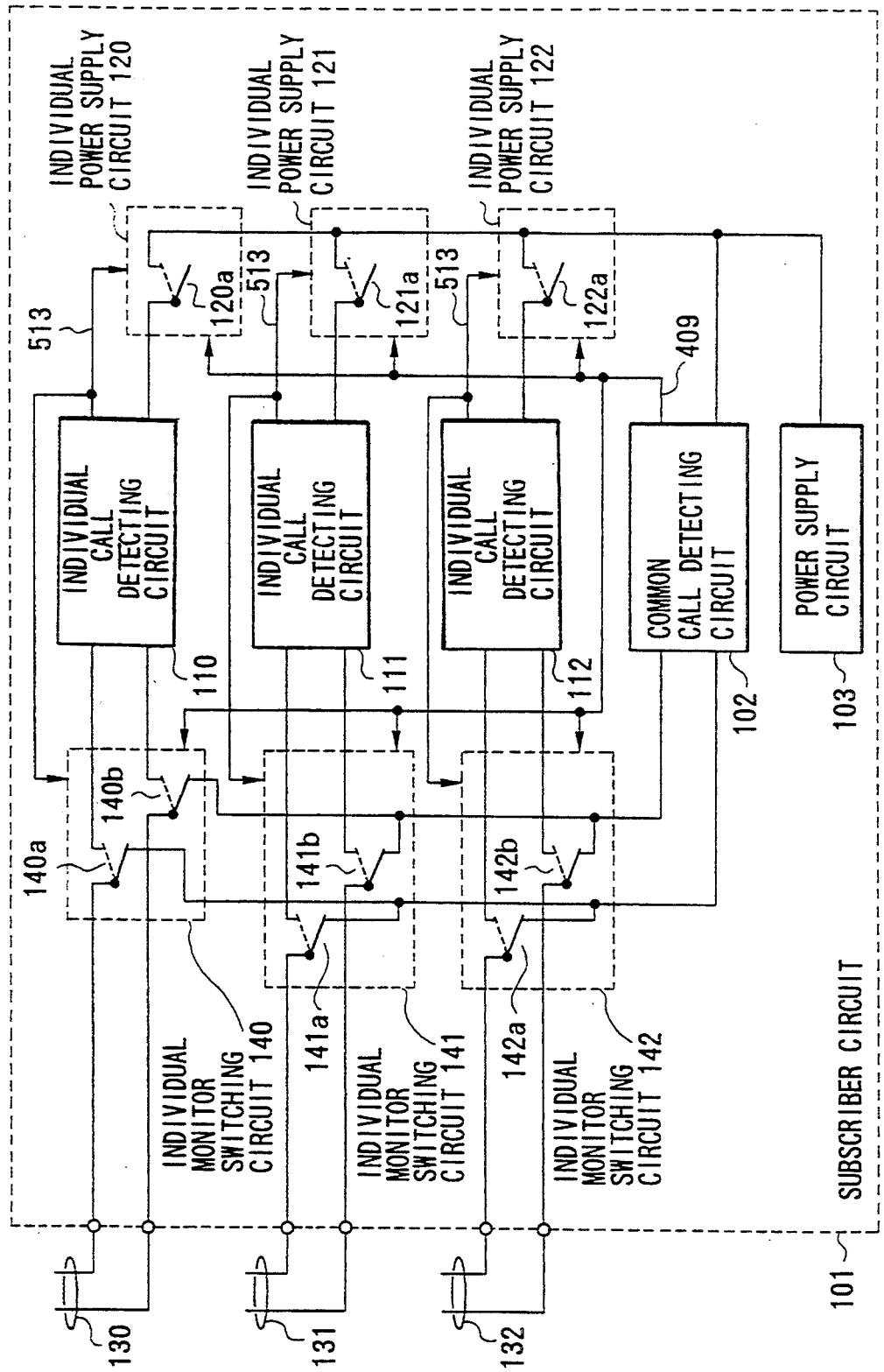
FIG. 2 is a block diagram for explaining a state wherein a call signal is detected by a common call detecting circuit in FIG. 1.

FIG. 2 shows a state of connection upon receiving a call originating signal from the telephone subscriber line 130. More specifically, when a call signal is sent from the telephone subscriber line 130 in the state of connection shown in FIG. 1, the common call detecting circuit 102 detects the call signal. At this time, the common call detecting circuit 102 does not recognize a specific telephone subscriber line, of the telephone subscriber lines 130 to 132, from which the detected call signal is sent.

In order to identify a specific telephone subscriber line, of the telephone subscriber lines 130 to 132, from which the call signal is sent, the common call detecting circuit 102 operates in the following manner. As shown in FIG. 2, the common call detecting circuit 102 controls the individual power supply circuits 120 to 122 by using a call detection signal 409 having a predetermined time width to operate the make contacts 120a, 121a, and 122a in the manner indicated by the broken lines, thereby supplying operating power from the power supply circuit 103 to the individual call detecting circuits 110 to 112. In addition, the common call detecting circuit 102 controls the individual monitor switching circuits 140 to 142 to operate the transfer contacts 140a, 140b, 141a, 141b, 142a, and 142b in the manner indicated by the broken lines, thereby connecting the telephone subscriber lines 130 to 132 to the individual call detecting circuits 110 to 112, respectively. With this operation, the state of connection shown in FIG. 2 is established so that the call signals originating from the respective telephone subscriber lines 130 to 132 can be individually monitored.

Figure 3:
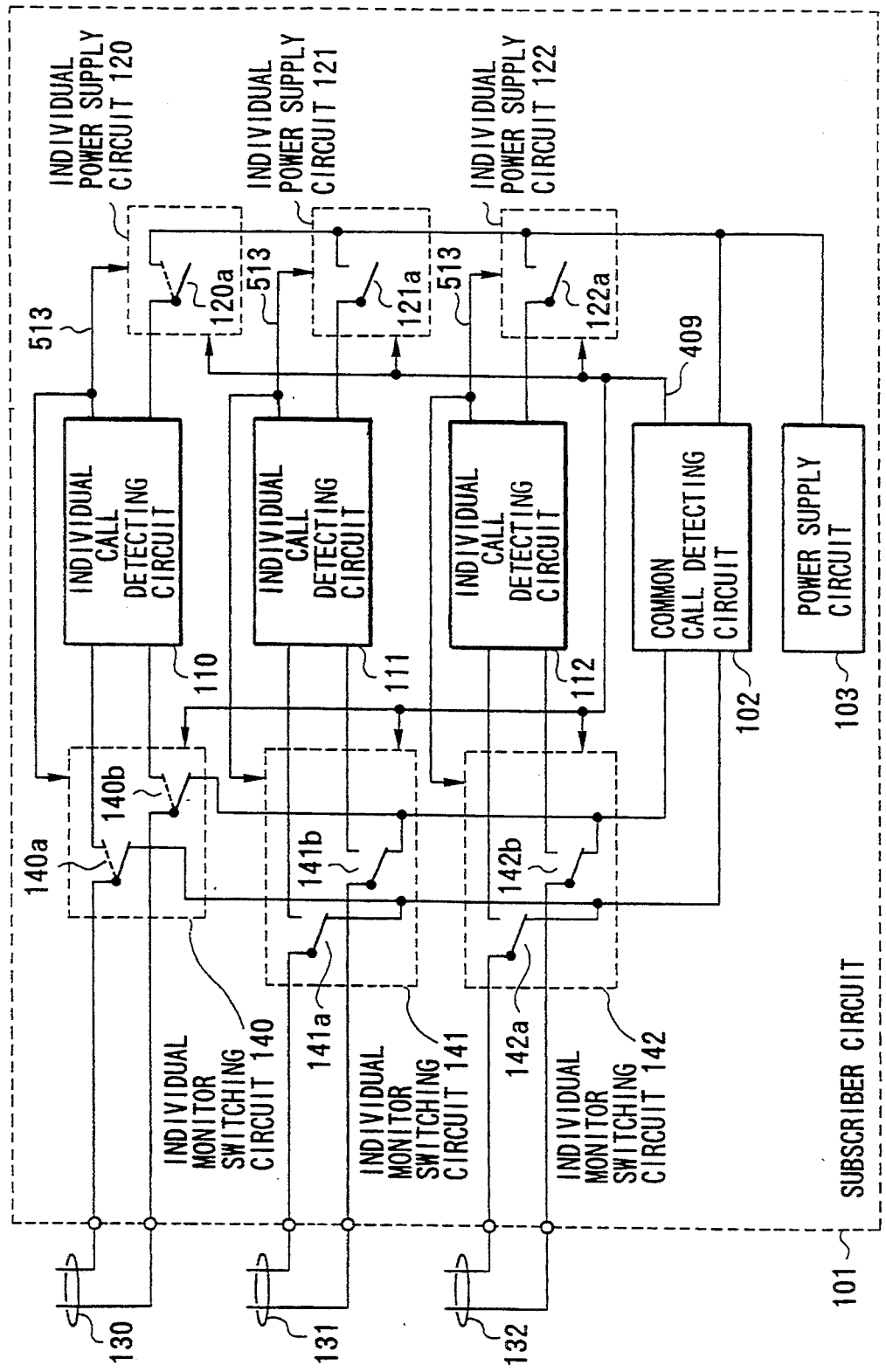
FIG. 3 is a block diagram for explaining a state wherein a call signal is detected by an individual call detecting circuit in FIG. 1.

FIG. 3 shows a state of connection upon causing the individual call detecting circuit 110 to detect a call signal originating from the telephone subscriber line 130. More specifically, as shown in FIG. 3, upon detecting a call signal that originates from the telephone subscriber line 130 in the state of connection shown in FIG. 2, the individual call detecting circuit 110 individually controls the individual monitor switching circuit 140 for the individual call detecting circuit 110 and the individual power supply circuit 120 by using a call detection signal 513 to hold the transfer contacts 140a and 140b and the make contact 120a of the respective circuits in the states indicated by the broken lines. The individual call detecting circuits 111 and 112, which have detected no outgoing call signals, do not output the detection signal 513 as a holding signal. For this reason, the individual monitor switching circuit 141, the individual power supply circuit 121, the individual monitor switching circuit 142, and the individual power supply circuit 122 respectively restore the transfer contacts 141a, 141b, 142a, and 142b and the make contacts 121a and 122a to the initial states so as to set the respective contacts in the states indicated by the solid lines a predetermined period of time after the common call detecting circuit 102 detects the call signal, i.e., at the end of the call detection signal 409 from the common call detecting circuit 102. With this operation, the telephone subscriber lines 131 and 132 are connected to the common call detecting circuit 102 again, and the supply of power from the power supply circuit 103 to the individual call detecting circuits 111 and 112 is stopped.

When the telephone subscriber line 130 is set in an on-hook state, the state of connection shown in FIG. 1, which is to be set in an on-hook state, is restored. More specifically, when the telephone subscriber line is set in an on-hook state, the call detection signal 513 from the individual call detecting circuit 110 is disabled, and the holding operation is completed. Consequently, the individual monitor switching circuit 140 and the individual power supply circuit 120 respectively restore the transfer contacts 140a and 140b and the make contact 120a to the initial states.

Figure 4:
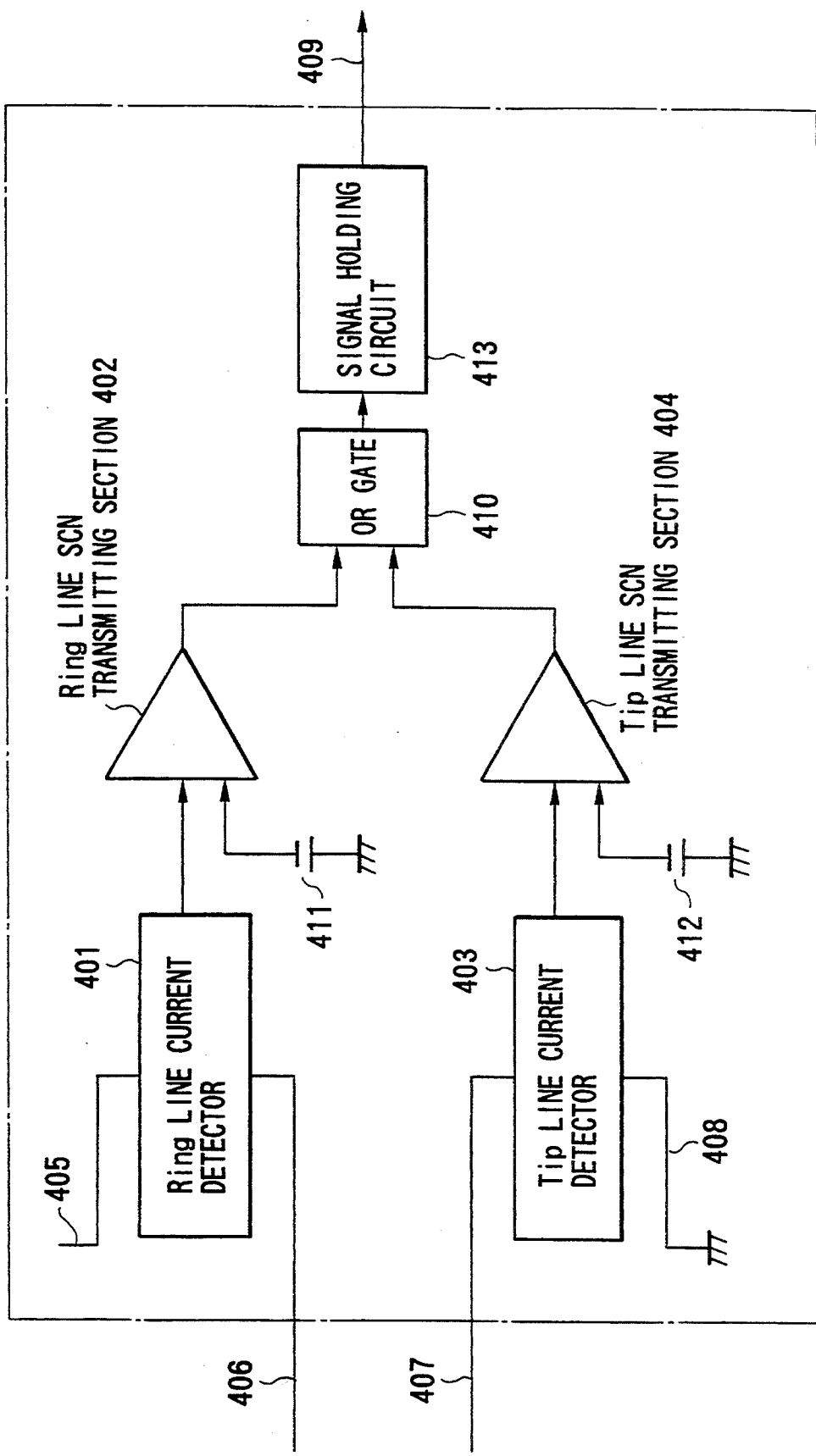
FIG. 4 is a block diagram showing an arrangement of the common call detecting circuit in FIG. 1.

FIG. 4 shows an arrangement of the common call detecting circuit 102 in FIG. 1. The common call detecting circuit 102 comprises a Ring line current detector 401 and a Tip line current detector 403, both designed to detect currents and convert the current values into voltage values, a Ring line SCN transmitting section 402 and a Tip line SCN transmitting section 404, both designed to compare voltages and output comparison results, a Ring line reference voltage circuit 411 and a Tip line reference voltage circuit 412, both designed to generate reference voltages, an OR gate 410, a signal holding circuit 413 for holding a signal for a predetermined period of time, Ring and Tip lines 406 and 407 connected to the telephone subscriber lines 130 to 132 of this embodiment, a −48-V power line 405 and a G line 408, both constituting an operating power supply, and a common call signal line 409 for controlling the individual power supply circuits 120 to 122 and the individual monitor switching circuits 140 to 142.

An operation of the common call detecting circuit 102 will be described next. When a call is sent from one of the telephone subscriber lines 130 to 132 connected to the Tip and Ring lines 407 and 406, a current flows from the G line 408 to the −48-V power line 405 through the Tip line current detector 403, the Tip line 407, and the telephone subscriber line from which the call is sent, the Ring line 406, and the Ring line current detector 401. The Tip line current detector 403 converts the value of the current flowing in the Tip line 407 into a voltage value, and outputs it to the Tip line SCN transmitting section 404. The Tip line SCN transmitting section 404 compares the voltage value generated by the Tip line reference voltage circuit 412 with the voltage value received from the Tip line current detector 403, thus detecting that a current larger than a reference current value flows in the Tip line 407. The Tip line SCN transmitting section 404 then outputs a Tip line side call signal to the OR gate 410. Similarly, the Ring line current detector 401 converts the value of the current flowing in the Ring line 406 into a voltage value, and outputs it to the Ring line SCN transmitting section 402. The Ring line SCN transmitting section 402 compares the voltage value generated by the Ring line reference voltage circuit 411 with the voltage value received from the Ring line current detector 401, thus detecting that a current larger than a reference current value flows in the Ring line 406. The Ring line SCN transmitting section 402 then a Ring line side outgoing call signal to the OR gate 410. The OR gate 410 logically ORs the Tip line side call signal from the Tip line SCN transmitting section 404 and the Ring line side call from the Ring line SCN transmitting section 402, and outputs the resultant signal to the signal holding circuit 413. The signal holding circuit 413 outputs the call signal from the OR gate 410, as a signal for controlling the individual power supply circuits 120 to 122 and the individual monitor switching circuits 140 to 142, to the call detection signal 409, and holds the signal for a period of time enough to allow the individual call detecting circuits 110 to 112 of the embodiment to detect call signals originating from the telephone subscriber lines 130 to 132 respectively connected the circuits 110 and 112.

Assume that the Tip lines of the telephone subscriber lines 130 to 132 are brought into contact with power lines during an on-hook period of the telephone subscriber lines 130 to 132, and a current flows in the Tip line 407. In this case, the Tip line current detector 403 converts the current value into a voltage value. The Tip line SCN transmitting section 404 compares the voltage value generated by the Tip line reference voltage circuit 412 with the voltage value received from the Tip line current detector 403, thus detecting that a current larger than a reference current value flows in the Tip line 407. The Tip line SCN transmitting section 404 then outputs a Tip line side call signal to the OR gate 410. The OR gate 410 outputs the Tip line side call signal to the signal holding circuit 413. The signal holding circuit 413 outputs the signal to the call detection signal 409 and holds it for a predetermined period of time. Similarly, assume that the Ring lines of the telephone subscriber lines 130 to 132 are grounded during an on-hook period of the telephone subscriber lines 130 to 132, and a current flows in the Ring line 406. In this case, the Ring line current detector 401 converts the current value into a voltage value. The Ring line SCN transmitting section 402 compares the voltage value generated by the Ring line reference voltage circuit 411 with the voltage value received from the Ring line current detector 401, thus detecting that a current larger than a reference current value flows in the Ring line 406. The Ring line SCN transmitting section 402 then outputs a Ring line side call signal to the OR gate 410. The OR gate 410 outputs the Ring line side call signal to the signal holding circuit 413. The signal holding circuit 413 outputs the signal to the call detection signal 409 and holds it for a predetermined period of time. Note that the predetermined period of time may be set to be long enough to allow the individual call detecting circuits 110 to 112 to respectively detect calls from the telephone subscriber lines 130 to 132, e.g., 100 ms or more.

Figure 5:
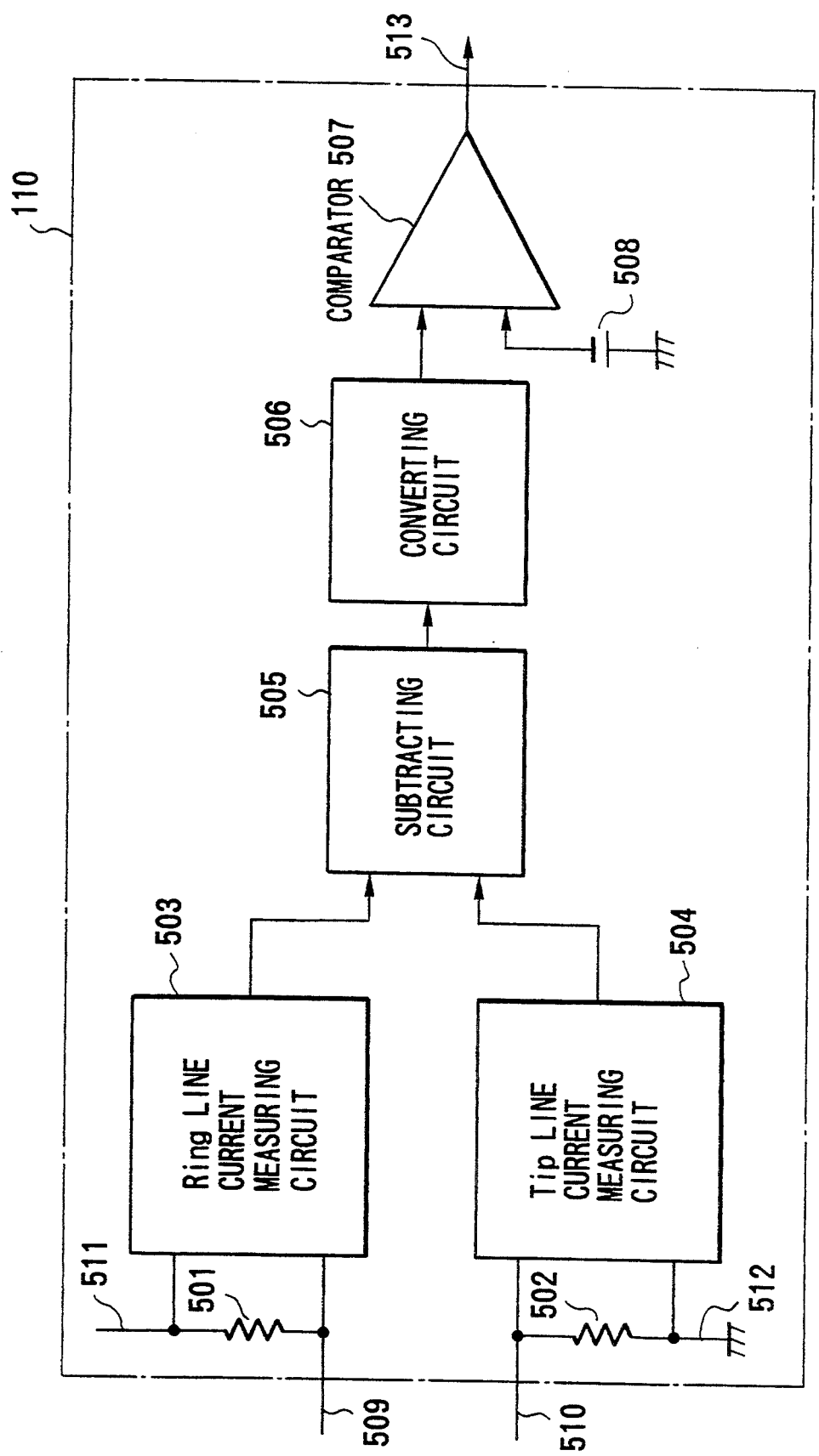
FIG. 5 is a block diagram showing an arrangement of an individual call detecting circuit in FIG. 1.

FIG. 5 shows an arrangement of each of the individual call detecting circuits 110 to 112 in FIG. 1. Since the individual call detecting circuits 110 to 112 are identical, the individual call detecting circuit 110 will be described as a representative.

The individual call detecting circuit 110 includes reference resistors 501 and 502, a Ring line current measuring circuit 503 and a Tip line current measuring circuit 504, both designed to measure currents, a subtracting circuit 505 for subtracting current values from each other, a converting circuit 506 for converting a current value into a voltage value, a comparator 507 for comparing voltages and outputting the comparison result, a reference voltage circuit 508 for generating a reference voltage, Ring and Tip lines 509 and 510 connected to the telephone subscriber line 130 of the embodiment, a −48-V power line 511 and a G line 512, both for supplying a DC telephone current to the telephone subscriber line 130, and an call signal line 513 for displaying a call originating from a telephone subscriber.

An operation of the individual call detecting circuit 110 will be described next. When an call is sent from the telephone subscriber line 130 connected to the Ring and Tip lines 509 and 510, the Ring and Tip lines 509 and 510 are connected to each other through the telephone subscriber line 130 and the telephone unit. As a result, currents flow in the Ring and Tip lines 509 and 510. At this time, a voltage drop occurs in the Ring line 509 owing to the reference resistor 501 to cause a potential difference with respect to the −48-V power line 511. The Ring line current measuring circuit 503 measures the current flowing in the Ring line 509 by using this potential difference, and outputs the current value to the subtracting circuit 505. Similarly, in the Tip line 510, a potential difference is caused between the G line 512 and the Tip line 510 by the reference resistor 502. The Tip line current measuring circuit 504 measures the current flowing in the Tip line 510 by using this potential difference, and outputs the current value to the subtracting circuit 505. The subtracting circuit 505 subtracts the currents flowing in the Ring and Tip lines 509 and 510 from each other, and outputs the resultant value to the converting circuit 506. The current values flowing in the Ring an Tip lines 509 and 510 have opposite phases. Therefore, the subtraction value is the sum of the currents flowing in the Ring and Tip lines 509 and 510. The converting circuit 506 converts the current value into a voltage value, and outputs it to the comparator 507. The comparator 507 compares the voltage value generated by the reference voltage circuit 508 with the voltage value from the converting circuit 506, thus detecting that a current larger than a reference current value flows. The comparator 507 then outputs a call signal detection signal to the call detecting signal 513. This call signal detection signal is kept output while the call continues, and is disabled when the call is ended.

Figure 6:
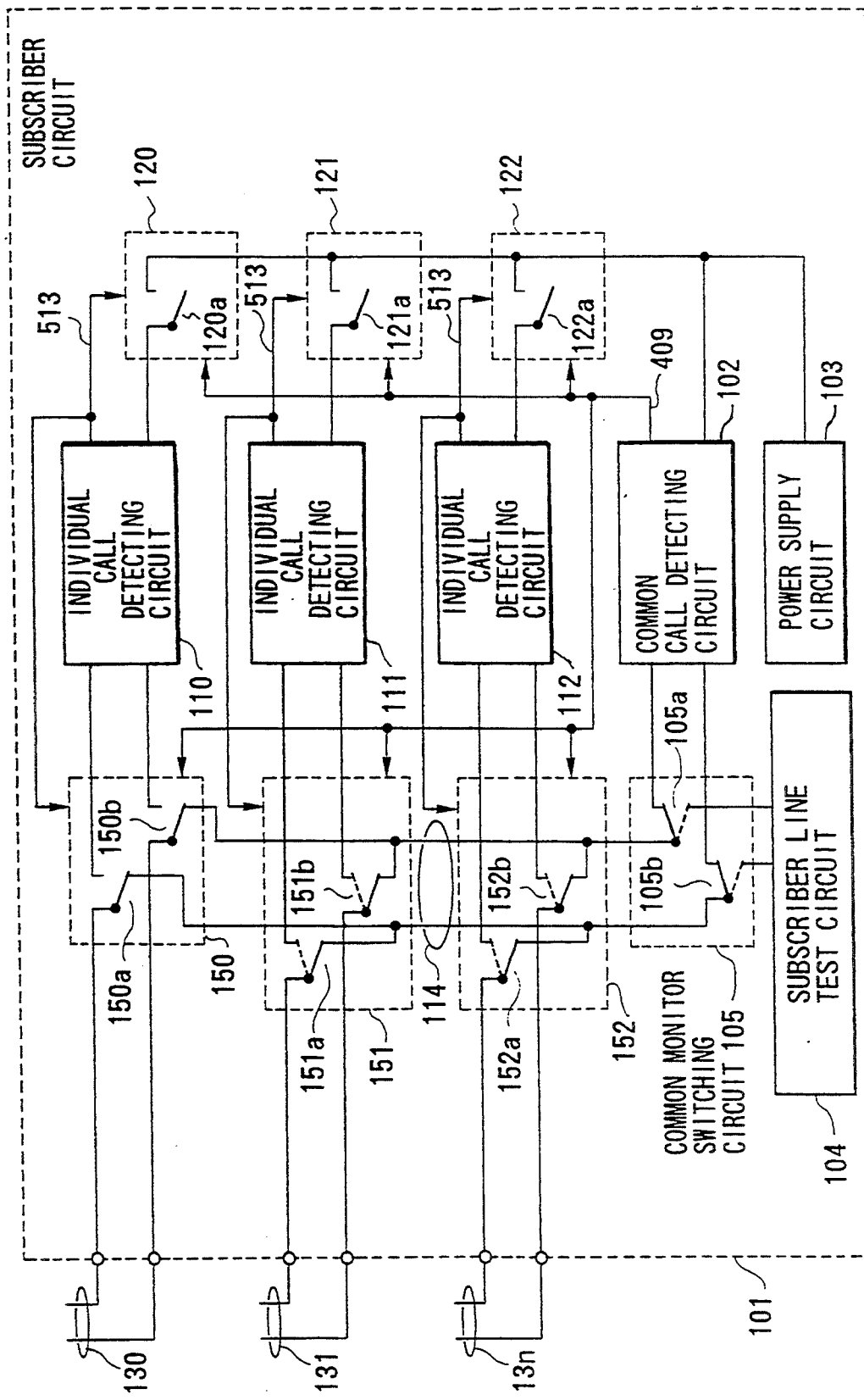
FIG. 6 is a block diagram showing an call detection control apparatus according to another embodiment of the present invention.
Figure 7:
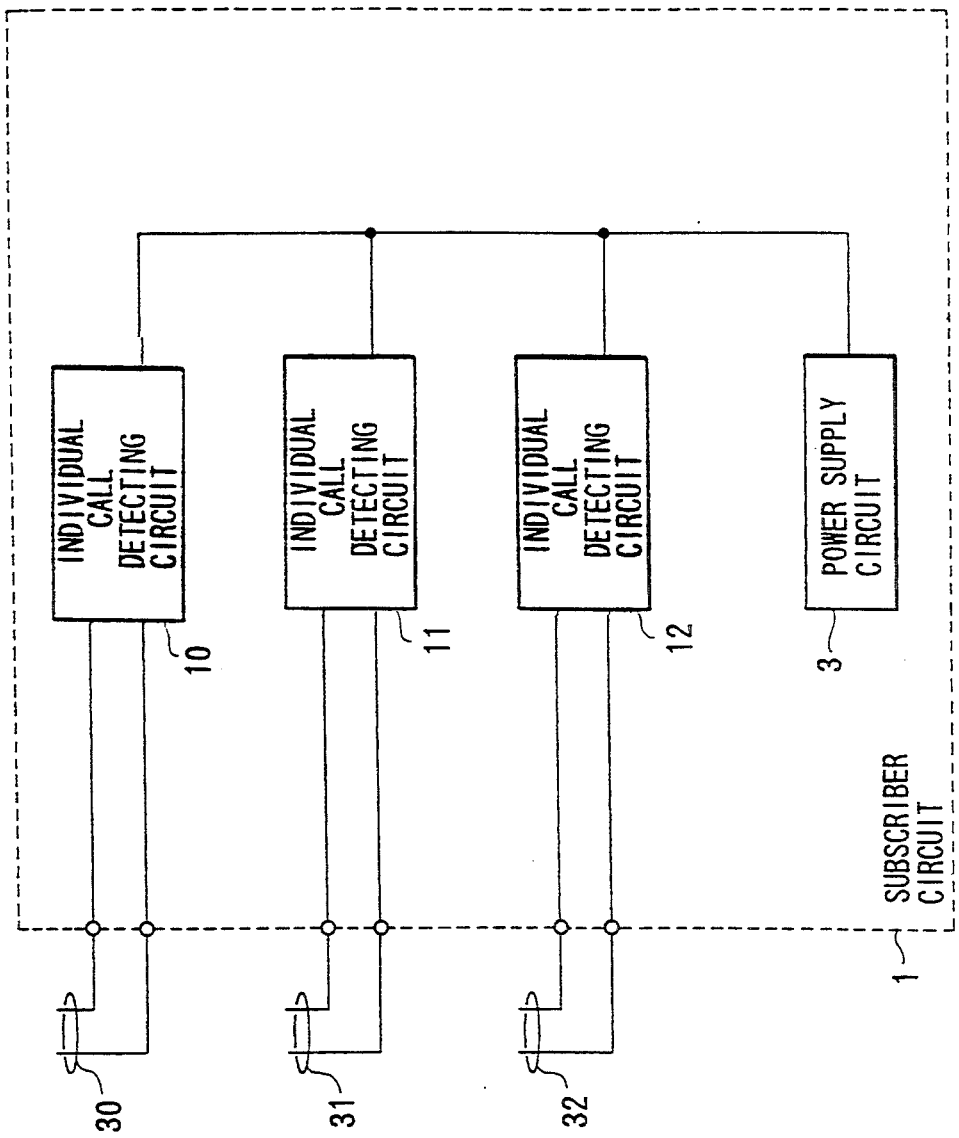
FIG. 7 is a block diagram showing a conventional call detection control apparatus.

FIG. 6 shows a call detection control apparatus according to another embodiment of the present invention. The embodiments shown in FIGS. 1 and 6 differ in the following point. In the embodiment shown in FIG. 1, the telephone subscriber lines 130 to 132 are switched to the common call detecting circuit 102 by the individual monitor switching circuits 140 to 142, respectively. However, in the embodiment shown in FIG. 6, telephone subscriber lines 130 to 132 are switched to a common test connection path 114 by using individual test switching circuits 150 to 152 for switching the telephone subscriber lines 130 to 132 to a subscriber line test circuit 104, and the common test connection path 114 is switched to the subscriber line test circuit 104 and the common call detecting circuit 102 by a common monitor switching circuit 105. The same reference numerals in FIG. 6 denote the same parts as in FIG. 1, and a description thereof will be omitted.

A telephone subscriber line test operation in this embodiment will be described next.

Assume that line states, e.g., insulation resistances and stray capacitances, of the telephone subscriber lines 130 to 132 are tested by the subscriber line test circuit 104. In this case, for example, pairs of transfer contacts 151a and 151b, and 152a and 152b of the individual test switching circuits 151 and 152 for telephone subscriber lines other than the telephone subscriber line 130 to be tested are operated in the manner indicated by the broken lines in FIG. 6 to connect the telephone subscriber lines 131 and 132 other than the target telephone subscriber line 130 to the individual call detecting circuits 111 and 112, respectively. At the same time, make contacts 121a and 122a of the individual power supply circuits 121 and 122 are operated to supply power thereto so as to individually monitor calls originating from telephone subscribers during the test. Meanwhile, a pair of transfer contacts 150a and 150b of the individual test switching circuit 150 for the target telephone subscriber line 130 are not operated (i.e., kept in the states indicated by the solid lines) and are kept connected to the common test connection path 114 to the subscriber line test circuit 104. Subsequently, a pair of transfer contacts 105a and 105b of the common monitor switching circuit 105 are operated in the manner indicated by broken lines in FIG. 6 to connect the target telephone subscriber line 130 to the subscriber line test circuit 104, thereby testing the line states of the line 130. When the line state test is completed by the subscriber line test circuit 104, the pair of transfer contacts 105a and 105b of the common monitor switching circuit 105 are restored to the initial states, and the pairs of transfer contacts 151a and 151b, and 152a and 152b of the individual test switching circuits 151 and 152 other than the target telephone subscriber line 130 are restored to the initial states, as indicated by the solid lines in FIG. 6, thus restoring the overall circuit to the initial state of connection.

In this subscriber line test operation, the individual test switching circuits 150 to 152, the individual power supply circuits 120 to 122, and the common monitor switching circuit 105 are controlled by the subscriber line test circuit or a control means (not shown).

A call detecting operation in this embodiment will be described next.

When all the telephone subscriber lines 130 to 132 are in an on-hook state, the break contacts of the pairs of transfer contacts 150a and 150b, 151a and 151b, and 152a and 152b of the individual test switching circuits 150 to 152 are connected, through the common test connection path 114 and the break contact of the transfer contacts 105a and 105b of the common monitor switching circuit 105, to the common call detecting circuit 102 for commonly monitoring a call originating from each of the telephone subscriber lines 130 to 132. The supply of power from the power supply circuit 103 to the individual call detecting circuits 110 to 112 is stopped by make contacts 120a, 121a, and 122a of the individual power supply circuits 120 to 122. Meanwhile, power is being directly supplied from the power supply circuit 103 to the common call detecting circuit 102.

When, for example, a call signal is sent from the telephone subscriber line 130 in this state, the common call detecting circuit 102 detects it. Note that the common call detecting circuit 102 does not recognize a specific telephone subscriber line, of the telephone subscriber lines 130 to 132, from which the call signal is sent. In order to identify the telephone subscriber line from which the call signal is sent, the common call detecting circuit 102 controls the individual power supply circuits 120 to 122 to operate the make contacts 120a, 121a, and 122a so as to supply operating power from the power supply circuit 103 to the individual call detecting circuits 110 to 112. In addition, the common call detecting circuit 102 controls the individual test switching circuits 150 to 152 to operate the transfer contacts 150a, 150b, 151a, 151b, 152a, and 152b so as to connect the telephone subscriber lines 130 to 132 to the individual call detecting circuits 110 to 112, respectively, thereby causing the circuits 110 to 112 to individually monitor call signals originating from the respective telephone subscriber lines 130 to 132.

Upon detecting a call signal originating from the telephone subscriber line 130, the individual call detecting circuit 110 individually controls the individual test switching circuit 150 and the individual power supply circuit 120, both designed for the individual call detecting circuit 110, by using a call detection signal 513, thus holding the transfer contacts 150a and 150b and the make contact 120a in the respective circuits in the current states. The individual test switching circuits 151 and 152 and the individual power supply circuits 121 and 122, both pairs corresponding to the individual call detecting circuits 111 and 112, respectively, which have detected no calls within a predetermined period of time, restore the transfer contacts 151a, 151b, 152a, and 152b, and the make contacts 121a and 122a to the initial states. With this operation, the telephone subscriber lines 131 and 132 are connected to the common call detecting circuit 102, and the supply of power from the power supply circuit 103 to the individual call detecting circuits 111 and 112 is stopped.

When the telephone subscriber line 130 is set in an on-hook state, the overall circuit is restored to the state of connection shown in FIG. 6. More specifically, when the telephone subscriber line 130 is set in an on-hook state, the individual call detecting circuit 110 individually controls the individual test switching circuit 150 and the individual power supply circuit 120 to restore the transfer contacts 150a and 150b and the make contact 120a to the initial states.

In each embodiment described above, the call detection signal 409 is held for a predetermined period of time by the signal holding circuit 413 of the common call detecting circuit 102 to externally hold power supply and line switching operations with respect to the individual call detecting circuits 110 to 112. However, the operations of the individual power supply circuits 120 to 122 and the individual monitor switching circuits 140 to 142 may be internally held by the call detection signal 409 from the common call detecting circuit 102, and the holding operations may be restored by reset signals from the individual call detecting circuits 110 to 112. In this case, a reset signal is generated when an individual call is not detected within a predetermined period of time after power is supplied, and when a call is ended.

According to this embodiment, by using the individual test switching circuits, individual monitor switching circuits need not be respectively arranged for telephone subscriber lines, thus providing great advantages in terms of economy, durability, reliability, size, weight, and the like.

As has been described above, according to the present invention, power is supplied to only an individual call detecting circuit for a telephone subscriber line in an off-hook state. Therefore, no power is consumed in an individual call detecting circuit in an on-hook state.

Even if the number of individual call detecting circuits increases with an increase in the number of telephone subscriber lines, the total power consumption of individual call detecting circuits in an on-hook state, which are in the majority, is zero, and power is consumed in only the common call detecting circuit. That is, the power consumption of individual call detecting circuits during an on-hook period is not increased even if the number of telephone subscriber lines is increased. Therefore, the power consumption associated with the subscriber circuits of the telephone switching system can be reduced.

What is claimed is:

1. A call detection control apparatus for controlling the detection of call signals originating through telephone subscriber lines connected with individual telephone subscriber terminals, the apparatus comprising:
   a plurality of individual call detecting means for detecting respective call signals originating from corresponding telephone subscriber lines;
   common call detecting means for simultaneously detecting call signals originating from the respective telephone subscriber lines, the common call detecting means being connected to all the telephone subscriber lines when a call signal is not detected by said common call detecting means;
   a plurality of first switching means associated with respective individual call detecting means for switching the telephone subscriber lines from said common call detecting means to the corresponding individual call detecting means when said common call detecting means detects a call signal originating from at least one of the telephone subscriber lines; and power supply means for supplying power to said common call detecting means, and for supplying operating power to each of said individual call detecting means only when said common call detecting means detects the call signal originating from at least one of the telephone subscriber lines.

2. An apparatus according to claim 1, wherein the power supply means comprises a plurality of individual power supply means for supplying power from said power supply means to respective individual call detecting means in response to a call detecting signal from said common call detecting means, and the apparatus further comprising means for restoring to initial states those first switching means of said plurality of first switching means and those individual power supply means of said plurality of individual power supply means that are associated with individual call detecting means which do not detect a call signal when the telephone subscriber lines are switched from said common call detecting means to the individual call detecting means.

3. An apparatus according to claim 2, wherein said common call detecting means comprises timer means for counting a predetermined period of time, which starts when said common call detecting means detects said call signal, and for providing an output so that said individual power supply means and said first switching means, associated with said individual call detecting means which did not detect a call signal, are restored to said initial states.

4. An apparatus according to claim 3, wherein said timer means is a signal holding circuit for holding a call detecting signal from said common call detecting means for a predetermined period of time.

5. An apparatus according to claim 3, further comprising means for holding an operation of each of said individual power supply means and an operation of each of said first switching means by a call detecting signal from a corresponding one of said individual call detecting means until an off-hook state is ended.

6. An apparatus according to claim 1, further comprising subscriber line test means for selectively performing a line state test of each of the telephone subscriber lines, and second switching means for further switching a common test connection path, switched by said first switching means, to said common call detecting means and said subscriber line test means, so that each of the telephone subscriber lines is connected to said common call detecting means through said first and second switching means during a period other than a subscriber line test period.

7. An apparatus according to claim 6, further comprising means for connecting, during the subscriber line test period, each of the telephone subscriber lines which are not tested to corresponding one of said individual call detecting means through said first switching means, and for connecting one of the telephone subscriber lines which is tested to said subscriber line test means through said first and second switching means.

8. An apparatus according to claim 1, wherein said first switching means comprise relays for connecting all of said telephone subscriber lines to said common call detecting means when the call signal is not detected by said common call detecting means, and to said corresponding individual call detecting means when the call signal is detected by said common call detecting means.

9. An apparatus according to claim 2, wherein said individual power supply means comprise relays for connecting said power supply means to said respective individual call detecting means when the call signal is detected by said common call detecting means.

10. A call detection control apparatus for controlling the detection of call signals originating through telephone subscriber lines connected with individual telephone subscriber terminals, the apparatus comprising:

a plurality of individual call detecting means for detecting respective call signals originating from corresponding telephone subscriber lines;

common call detecting means for detecting call signals originating from the telephone subscriber lines, the common call detecting means being connected to all the telephone subscriber lines when a call signal is not detected by said common call detecting means;

a plurality of first switching means associated with respective individual call detecting means for switching the telephone subscriber lines from said common call detecting means to the corresponding individual call detecting means when said common call detecting means detects a call signal originating from at least one of the telephone subscriber lines, the first switching means including relays for connecting all of said telephone subscriber lines to said common call detecting means when the call signal is not detected by said common call detecting means, and to said corresponding individual call detecting means when the call signal is detected by said common call detecting means;

power supply means for supplying power to said common call detecting means, and for supplying operating power to each of said individual call detecting means only when said common call detecting means detects the call signal originating from at least one of the telephone subscriber lines;

the power supply means including a plurality of individual power supply means for supplying power from said power supply means to respective individual call detecting means only in response to a call detecting signal from said common call detecting means, the individual power supply means including relays for connecting said power supply means to said respective individual call detecting means when the call signal is detected by said common call detecting means; and means for restoring to initial states those first switching means of said plurality of first switching means and those individual power supply means of said plurality of individual power supply means that are associated with individual call detecting means which do not detect a call signal when the telephone subscriber lines are switched from said common call detecting means to the individual call detecting means.

11. A call detection control apparatus for controlling the detection of call signals originating through telephone subscriber lines connected with individual telephone subscriber terminals, the apparatus comprising:

a plurality of individual call detecting means for detecting respective call signals originating from corresponding telephone subscriber lines;

common call detecting means for detecting call signals originating from the telephone subscriber lines, the common call detecting means being connected to all the telephone subscriber lines when a call signal is not detected by said common call detecting means;

a plurality of first switching means associated with respective individual call detecting means for switching the telephone subscriber lines from said common call detecting means to the corresponding individual call detecting means when said common call detecting means detects a call signal originating from at least one of the telephone subscriber lines;

power supply means for supplying power to said common call detecting means, and for supplying operating power to each of said individual call detecting means only when said common call detecting means detects the call signal originating from at least one of the telephone subscriber lines;

the power supply means including a plurality of individual power supply means for supplying power from said power supply means to respective individual call detecting means in response to a call detecting signal from said common call detecting means;

means for restoring to initial states those first switching means of said plurality of first switching means and those individual power supply means of said plurality of individual power supply means that are associated with individual call detecting means which do not detect a call signal when the telephone subscriber lines are switched from said common call detecting means to the individual call detecting means;

subscriber line test means for selectively performing a line state test of each of the telephone subscriber lines;

second switching means for switching a common test connection path, switched by said first switching means, to said common call detecting means and said subscriber line test means, so that each of the telephone subscriber lines is connected to said common call detecting means through said first and second switching means during a period other than a subscriber line test period; and means for connecting, during the subscriber line test period, each of the telephone subscriber lines which are not tested to corresponding one of said individual call detecting means through said first switching means, and for connecting one of the telephone subscriber lines which is tested to said subscriber line test means through said first and second switching means.

* * * * *
* * * * *